Patented Apr. 6, 1926.

1,579,562

UNITED STATES PATENT OFFICE.

ERNEST MUEHLBERG, OF CHICAGO, ILLINOIS.

PREPARATION USEFUL IN THE TREATMENT OF ECZEMA.

No Drawing.   Application filed October 25, 1923. Serial No. 670,654.

*To all whom it may concern:*

Be it known that I, ERNEST MUEHLBERG, a citizen of the United States, residing at Chicago, in the county of Cook and State of Illinois, have invented a certain new and useful Improvement in Preparation Useful in the Treatment of Eczema, of which the following is a specification.

My invention relates to a composition of matter having curative properties and adapted to be used as an application or a dressing for eczema.

The invention consists of a mixture of substantially equal quantities of finely powdered potato flour and wood ashes.

I divide the powdered flour and wood ashes in any suitable manner and mix them, for example, by screening them together, to form a finely divided powder in which both elements are present in substantially equal quantities and in thorough mixture.

The powder may be applied to the affected parts in any suitable manner and may be used with or as a dressing or many be applied dry or dusted on like talcum powder.

While I have found that a mixture composed of about equal parts of each ingredient is peculiarly effective in the treatment of eczema, nevertheless I do not limit myself to any specific proportion since good results may be obtained with a preponderance of the one or the other ingredient.

I claim:

1. A composition of matter consisting of a finely divided mixture of potato flour and wood ashes.

2. A composition of matter consisting of a finely divided mixture of potato flour and wood ashes mixed in substantially equal proportions.

Signed at Chicago county of Cook and State of Illinois, this 18th day of October 1923.

ERNEST MUEHLBERG.